(12) United States Patent
Kornstein et al.

(10) Patent No.: US 9,233,724 B2
(45) Date of Patent: *Jan. 12, 2016

(54) HULL ROBOT DRIVE SYSTEM

(71) Applicant: Raytheon Company, Waltham, MA (US)

(72) Inventors: Howard R. Kornstein, Lexington, MA (US); James H Rooney, III, Harvard, MA (US); Jeremy C. Hermann, Hudson, MA (US); Jonathan T. Longley, Andover, MA (US); Joel N. Harris, Westborough, MA (US); Wen-te Wu, Rocky Hill, CT (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/794,594

(22) Filed: Mar. 11, 2013

(65) Prior Publication Data

US 2014/0090906 A1    Apr. 3, 2014

Related U.S. Application Data

(63) Continuation of application No. 12/587,949, filed on Oct. 14, 2009, now Pat. No. 8,393,421.

(51) Int. Cl.
*B62D 55/265* (2006.01)
*B63B 59/08* (2006.01)
*H01F 7/04* (2006.01)

(52) U.S. Cl.
CPC .............. *B62D 55/265* (2013.01); *B63B 59/08* (2013.01); *H01F 7/04* (2013.01)

(58) Field of Classification Search
CPC .............................. B62D 57/00; B62D 75/032
USPC .......................... 180/9.1, 7.1, 167, 164; 901/1
See application file for complete search history.

(56) References Cited

U.S. PATENT DOCUMENTS

| 2,104,062 | A | 1/1938 | Temple |
| 2,132,661 | A | 10/1938 | Temple |
| 2,386,650 | A | 10/1945 | Bell |
| 3,058,783 | A | 10/1962 | Wadsworth et al. |
| 3,088,429 | A | 5/1963 | Johannessen |

(Continued)

FOREIGN PATENT DOCUMENTS

| CN | 2405719 | 11/2000 |
| CN | 2552648 | 5/2003 |

(Continued)

OTHER PUBLICATIONS

A Copenhagen Climate Treaty; Version 1.0 Draft; A Proposal for a Copenhagen Agreement by Members of the NGO Community; published Jun. 2009; pp. 1-78 (80 pages total).

(Continued)

*Primary Examiner* — Tony Winner (57) ABSTRACT

A hull robot includes a robot body, at least one drive module for maneuvering the robot about the hull, an on-board power source, and a motive subsystem for the drive module powered by the on-board power source. A plurality of permanent magnet elements are associated with the drive module and each are switchable between a non-shunted state when adjacent the hull and a shunted state when not adjacent the hull.

17 Claims, 12 Drawing Sheets

(56) References Cited

U.S. PATENT DOCUMENTS

| | | |
|---|---|---|
| 3,285,676 A | 11/1966 | Hetteen |
| 3,439,937 A | 4/1969 | Dixon |
| 3,554,300 A | 1/1971 | Rosenberg |
| 3,638,600 A | 2/1972 | Modrey |
| 3,682,265 A | 8/1972 | Hiraoka et al. |
| 3,750,129 A | 7/1973 | Takeno et al. |
| 3,777,834 A | 12/1973 | Hiraoka et al. |
| 3,906,572 A | 9/1975 | Winn |
| 3,922,991 A | 12/1975 | Woods |
| 3,934,664 A | 1/1976 | Pohjola |
| 3,946,692 A | 3/1976 | Sierra et al. |
| 3,960,229 A | 6/1976 | Shio |
| 3,984,944 A | 10/1976 | Maasberg et al. |
| 4,046,429 A | 9/1977 | Pohjola |
| 4,079,694 A | 3/1978 | Galinou |
| 4,119,356 A | 10/1978 | Pohjola |
| 4,135,492 A | 1/1979 | Heitland |
| 4,135,592 A | 1/1979 | Wincent |
| 4,202,453 A | 5/1980 | Wilkes |
| 4,251,791 A | 2/1981 | Yanagisawa et al. |
| 4,401,048 A | 8/1983 | Rogers |
| 4,444,146 A | 4/1984 | DeWitz et al. |
| 4,574,722 A | 3/1986 | Orita et al. |
| 4,674,949 A | 6/1987 | Kroczynski |
| 4,690,092 A | 9/1987 | Rabuse |
| 4,697,536 A | 10/1987 | Hirata |
| 4,697,537 A | 10/1987 | Smith |
| 4,734,954 A | 4/1988 | Greskovics et al. |
| 4,736,826 A | 4/1988 | White et al. |
| 4,788,498 A | 11/1988 | Uemura |
| 4,789,037 A | 12/1988 | Kneebone |
| 4,809,383 A | 3/1989 | Urakami |
| 4,841,894 A | 6/1989 | Nellessen, Jr. |
| 4,890,567 A | 1/1990 | Caduff |
| 4,926,775 A | 5/1990 | Andorsen |
| 5,048,445 A | 9/1991 | Lever et al. |
| 5,174,222 A | 12/1992 | Rogers |
| 5,203,646 A | 4/1993 | Landsberger et al. |
| 5,249,631 A | 10/1993 | Ferren |
| 5,253,605 A | 10/1993 | Collins |
| 5,253,724 A | 10/1993 | Prior |
| 5,285,601 A | 2/1994 | Watkin et al. |
| 5,337,434 A | 8/1994 | Erlich |
| 5,366,038 A | 11/1994 | Hidetsgu et al. |
| 5,378,994 A | 1/1995 | Novak et al. |
| 5,435,405 A | 7/1995 | Schempf et al. |
| 5,569,371 A | 10/1996 | Perling |
| 5,628,271 A | 5/1997 | McGuire |
| 5,831,432 A | 11/1998 | Mohri |
| 5,849,099 A | 12/1998 | McGuire |
| 5,852,984 A | 12/1998 | Matsuyama et al. |
| 5,884,642 A | 3/1999 | Broadbent |
| 5,894,901 A | 4/1999 | Awamura et al. |
| 5,947,051 A | 9/1999 | Geiger |
| 6,000,484 A | 12/1999 | Zoretich et al. |
| 6,053,267 A | 4/2000 | Fisher |
| 6,064,708 A | 5/2000 | Sakamaki |
| 6,102,145 A | 8/2000 | Fisher |
| 6,125,955 A | 10/2000 | Zoretich et al. |
| 6,209,473 B1 | 4/2001 | Jones et al. |
| 6,276,478 B1 | 8/2001 | Hopkins et al. |
| 6,317,387 B1 | 11/2001 | D'Amaddio et al. |
| 6,564,815 B2 | 5/2003 | McGuire |
| 6,595,152 B2 | 7/2003 | McGuire |
| 6,698,375 B2 | 3/2004 | Delfosse |
| 6,698,376 B2 | 3/2004 | Delahousse et al. |
| 6,792,335 B2 | 9/2004 | Ross et al. |
| 6,886,486 B2 | 5/2005 | Van Rompay |
| 6,886,651 B1 | 5/2005 | Slocum et al. |
| 6,974,356 B2 | 12/2005 | Hobson |
| 7,286,214 B2 | 10/2007 | Reinersman et al. |
| 7,290,496 B2 | 11/2007 | Asfar et al. |
| 7,296,530 B1 | 11/2007 | Bemstein et al. |
| 7,390,560 B2 | 6/2008 | Wallach |
| 7,496,226 B2 | 2/2009 | Negahdaripour et al. |
| 7,520,356 B2 | 4/2009 | Sadegh et al. |
| 7,866,421 B2 | 1/2011 | Moore et al. |
| 7,934,575 B2 | 5/2011 | Waibel et al. |
| 8,109,383 B1 | 2/2012 | Suderman et al. |
| 8,214,081 B2 | 7/2012 | Choi et al. |
| 8,342,281 B2 | 1/2013 | Rooney, III |
| 8,386,112 B2 | 2/2013 | Rooney, III |
| 8,393,286 B2 | 3/2013 | Rooney, III et al. |
| 8,393,421 B2 | 3/2013 | Kornstein et al. |
| 8,723,536 B2 | 5/2014 | Miyazaki et al. |
| 8,985,250 B1 | 3/2015 | Lussier et al. |
| 2003/0000445 A1 | 1/2003 | McGuire |
| 2004/0089216 A1 | 5/2004 | Van Rompay |
| 2004/0133999 A1 | 7/2004 | Walton |
| 2004/0250934 A1 | 12/2004 | Hamdan |
| 2005/0027412 A1 | 2/2005 | Hobson et al. |
| 2005/0156562 A1 | 7/2005 | Cohen et al. |
| 2005/0199171 A1 | 9/2005 | Eckland |
| 2005/0216125 A1 | 9/2005 | Huston et al. |
| 2006/0175439 A1 | 8/2006 | Steur et al. |
| 2006/0191457 A1 | 8/2006 | Murphy |
| 2006/0249622 A1 | 11/2006 | Steele |
| 2006/0261772 A1 | 11/2006 | Kim |
| 2007/0089916 A1 | 4/2007 | Lundstrom |
| 2007/0276552 A1 | 11/2007 | Rodocker et al. |
| 2007/0284904 A1 | 12/2007 | Carvalho |
| 2007/0284910 A1 | 12/2007 | Bruder |
| 2007/0284940 A1 | 12/2007 | Koolhiran |
| 2008/0009984 A1 | 1/2008 | Lee et al. |
| 2008/0202405 A1 | 8/2008 | Kern |
| 2008/0276407 A1 | 11/2008 | Schnittman |
| 2008/0281470 A1 | 11/2008 | Gilbert et al. |
| 2008/0300821 A1 | 12/2008 | Frank et al. |
| 2008/0308324 A1 | 12/2008 | Moser et al. |
| 2009/0078484 A1 | 3/2009 | Kocijan |
| 2009/0094765 A1 | 4/2009 | Osaka et al. |
| 2009/0166102 A1 | 7/2009 | Waibel et al. |
| 2009/0301203 A1 | 12/2009 | Brussieux |
| 2010/0000723 A1 | 1/2010 | Chambers |
| 2010/0126403 A1 | 5/2010 | Rooney, III et al. |
| 2010/0131098 A1 | 5/2010 | Rooney, III et al. |
| 2010/0217436 A1 | 8/2010 | Jones |
| 2010/0219003 A1 | 9/2010 | Rooney, III et al. |
| 2010/0238050 A1 | 9/2010 | Rhodes et al. |
| 2011/0050374 A1 | 3/2011 | Dvorak |
| 2011/0067615 A1 | 3/2011 | Rooney, III et al. |
| 2011/0083599 A1 | 4/2011 | Kornstein et al. |
| 2011/0208417 A1 | 8/2011 | Fink et al. |
| 2011/0282536 A1 | 11/2011 | Rooney, III |
| 2012/0006352 A1 | 1/2012 | Holappa et al. |
| 2012/0215348 A1 | 8/2012 | Skrinde |
| 2014/0076223 A1 | 3/2014 | Smith |
| 2014/0076224 A1 | 3/2014 | Smith |
| 2014/0076225 A1 | 3/2014 | Smith |
| 2014/0076226 A1 | 3/2014 | Smith |
| 2014/0077587 A1 | 3/2014 | Smith |
| 2014/0081504 A1 | 3/2014 | Smith |

FOREIGN PATENT DOCUMENTS

| | | |
|---|---|---|
| CN | 1864944 A | 11/2006 |
| CN | 101387687 A | 3/2009 |
| DE | 3611750 | 10/1987 |
| EP | 1785552 A2 | 5/2007 |
| FR | 1352056 A | 2/1964 |
| FR | 2861457 A1 | 4/2005 |
| FR | 2948920 A1 | 2/2011 |
| GB | 2038721 | 7/1980 |
| GB | 2103162 | 2/1983 |
| GB | 2165330 A | 4/1986 |
| JP | S48-014096 | 2/1973 |
| JP | S49-001434 | 1/1974 |
| JP | S 50-012797 | 2/1975 |
| JP | S5012797 | 2/1975 |
| JP | S 50-81487 U | 7/1975 |
| JP | 58-012075 | 1/1983 |
| JP | S58-14096 | 1/1983 |
| JP | S60-13117 | 7/1985 |
| JP | S60-131174 A | 7/1985 |

(56) References Cited

FOREIGN PATENT DOCUMENTS

| | | |
|---|---|---|
| JP | S62-13099 | 8/1987 |
| JP | 04-002592 | 1/1992 |
| JP | H04-002592 | 1/1992 |
| JP | H05-19086 | 1/1993 |
| JP | 06-099888 | 4/1994 |
| JP | 08-310384 | 11/1996 |
| JP | H08310384 | 11/1996 |
| JP | H10-16884 | 1/1998 |
| JP | 2003025265 | 1/2003 |
| JP | 2005-335882 | 12/2005 |
| WO | WO 99/74489 A1 | 2/1999 |
| WO | WO 02/074611 | 9/2002 |
| WO | WO 03/087501 A1 | 10/2003 |
| WO | WO 2005/014387 | 2/2005 |
| WO | WO 2005/014387 A1 | 2/2005 |
| WO | WO 2007/137234 A2 | 11/2007 |
| WO | WO 2010/059195 | 5/2010 |
| WO | WO 2010/134022 A1 | 11/2010 |
| WO | WO 2011/022037 | 2/2011 |
| WO | WO 2011015786 A1 | 2/2011 |
| WO | WO 2011/034558 | 3/2011 |
| WO | WO 2011/046592 | 4/2011 |
| WO | WO 2011/142800 | 11/2011 |
| WO | WO 2011/146103 | 11/2011 |
| WO | WO 2012/104109 A1 | 8/2012 |

OTHER PUBLICATIONS

Borchardt; Grooming the Fleet, Biofouling Slows Vessels and Wastes Fuels, so the Navy is Looking at an Underwater Robot to Keep its Hulls Shipshape; Mechanical Engineering; Apr. 2010; pp. 33-35; vol. 132, No. 4.

Garelick, et a; RTI International EnSys Energy & Systems, Inc.; Navigistics Consulting; Global Trade and Fuels Assessment—Future Trends and Effects of Designating Requiring Clean Fuels in the Marine Sector: Task Order No. 1; Draft Report; RTI Project No. 0209701.001; Apr. 2006; 82 pages.

Kohli; Biofouling and Design of a Biomimetic Hull-Grooming Tool; Naval Surface Warfare Center Carderock Division; West Bethesda; MD; NSWCCD-CISD-2007/002; Ship Systems Integration & Design Department Technical Report; Sep. 2007; 38 pages.

Man; B&W, Basic Principles of Ship Propulsion; Basics of Ship Propulsion; Apr. 2004; pp. 1-30.

Munk; Fuel Conservation Through Managing Hull Resistance; Motorship Propulsion Conference; Copenhangen; Apr. 26, 2006; pp. 1-10.

Preiser et al.; Energy (Fuel) Conservation Through Underwater Removal and Control of Fouling on Hulls of Navy Ships, Naval Research and Development Center, Materials Department, Annapolis, Research and Development Report, Dec. 1975; 52 pages.

Reed et al; Automatic Ship Hull Inspection Using Unmanned Underwater Vehicles; Proceedings from the 7th International Symposium on Technology and the Mine Problem; Monterey, USA; May 2006; 10 pages.

Rosenhahn et al; Advanced Nanostructures for the Control of Biofouling: the FP 6 EU Integrated Project AMBIO; Biointerphases; Mar. 2008; Published Feb. 21, 2008; pp. IR1-IR5; vol. 3; No. 1.

Tallett et al; Potential Marine Fuels Regulations: Impacts on Global Refining; Costs & Emissions; Joint IFQC & IPIECA Roundtable; Impacts of CO2 Emissions form Refining & Shipping; London, England; Oct. 1, 2007; 17 pages.

Townsin; The Ship Hull Fouling Penalty; Biofouling; Jan. 2003; pp. 9-15; vol. 19 (supplement).

Vaganay et al; Ship Hull Inspection with the HAUV: US Navy and NATO Demonstrations Results; OCEANS 2006; Sep. 2006; pp. 1-6.

Yuan et al.; The Design of Underwater Hull-Cleaning Robot; Journal of Marine Science and Application; Jun. 2001; pp. 41-45; vol. 3; No. 1.

U.S. Appl. No. 13/769,337, filed Feb. 17, 2013; Fraser M. Smith; office action dated Sep. 3, 2014.

U.S. Appl. No. 13/769,339, filed Feb. 17, 2013; Fraser M. Smith; office action dated Sep. 3, 2014.

U.S. Appl. No. 13/769,342, filed Feb. 17, 2013; Fraser M. Smith; office action dated Sep. 10, 2014.

U.S. Appl. No. 13/769,345, filed Feb. 17, 2013; Fraser M. Smith; office action dated Sep. 16, 2014.

U.S. Appl. No. 12/313,643, filed Nov. 21, 2008; James H. Rooney III; office action dated Aug. 25, 2014.

U.S. Appl. No. 12/583,346, filed Aug. 19, 2009; James H. Rooney III; office action dated Aug. 26, 2014.

Yaun et al. "The Design of Underwater Hull-Cleaning Robot," Journal of Marine Science and Application, vol. 3, No. 1, Hune 2004, pp. 41-45.

U.S. Appl. No. 12/583,346, filed Aug. 19, 2009; James H. Rooney III; office action dated Feb. 27, 2014.

U.S. Appl. No. 12/313,643, filed Nov. 21, 2008; James H. Rooney III; office action dated Feb. 26, 2014.

U.S. Appl. No. 12/800,174, filed May 10, 2010; James H. Rooney III; notice of allowance dated Aug. 17, 2012.

U.S. Appl. No. 12/313,643, filed Nov. 21, 2008; James H. Rooney III; office action dated Sep. 17, 2012.

U.S. Appl. No. 12/583,346, filed Aug. 19, 2009; James H. Rooney III; office action dated Feb. 27, 2013.

U.S. Appl. No. 12/587,949, filed Oct. 14, 2009; Howard R. Kornstein; notice of allowance dated Sep. 21, 2012.

U.S. Appl. No. 12/583,346, filed Aug. 19, 2009; James H. Rooney III; office action dated Sep. 25, 2012.

U.S. Appl. No. 12/800,486, filed May 17, 2010; James H. Rooney III; notice of allowance dated Sep. 27, 2012.

U.S. Appl. No. 12/586,248, filed Sep. 18, 2009; James H. Rooney III; notice of allowance dated Oct. 24, 2012.

U.S. Appl. No. 12/313,643, filed Nov. 21, 2008; James H. Rooney III; office action issued Apr. 13, 2012.

U.S. Appl. No. 12/586,248, filed Sep. 18, 2009; James H. Rooney III office action issued May 24, 2012.

U.S. Appl. No. 12/587,949, filed Oct. 14, 2009; Howard R. Kornstein; office action issued May 25, 2012.

U.S. Appl. No. 12/800,174, filed May 10, 2010; James H. Rooney III; office action issued Feb. 24, 2012.

U.S. Appl. No. 12/586,248, filed Sep. 18, 2009; James H. Rooney III; office action mailed Dec. 13, 2011.

PCT Application PCT/US2013/059546; filing date Sep. 12, 2013; Raytheon Company; International Search Report dated Jan. 20, 2014.

PCT Application PCT/US2013/059552; filing date Sep. 12, 2013; Raytheon Company; International Search Report dated Dec. 20, 2013.

PCT Application PCT/US2013/059548; filing date Sep. 12, 2013; Raytheon Company; International Search Report dated Apr. 16, 2014.

PCT Application PCT/US2013/059527; filing date Sep. 12, 2013; Raytheon Company; International Search Report dated Mar. 3, 2014.

PCT Application PCT/US2013/059551; filing date Sep. 12, 2013; Raytheon Company; International Search Report Mar. 10, 2014.

PCT Application PCT/US2013/059552; filing date Sep. 12, 2013; Raytheon Company; International Search Report Dec. 20, 2013.

PCT Application PCT/US2010/02163; filing date Aug. 4, 2010; Raytheon Company; International Search Report Oct. 13, 2010.

PCT Application PCT/US2010/02164; filing date Sep. 18, 2009; Raytheon Company; International Search Report Oct. 8, 2010.

PCT Application PCT/US2010/02693; filing date Oct. 6, 2010; Raytheon Company; International Search Report Dec. 9, 2010.

PCT Application PCT/US2011/00787; filing date May 5, 2011; Raytheon Company; International Search Report Jul. 20, 2011.

PCT Application PCT/US2011/000770; filing date May 3, 2011; Raytheon Company; International Search Report Aug. 9, 2011.

PCT Application PCT/US2013/059552; filing date Sep. 12, 2013; Raytheon Company; International Search Report Feb. 21, 2014.

Written Opinion of the International Searching Authority, International Application No. PCT/US2011/000787, Jul. 20, 2011, 7 pgs. (unnumbered).

Written Opinion of the International Searchign Authority, International Application No. PCT/US2011/000770, Aug. 9, 2011, 5 pgs. (unnumbered).

(56) References Cited

OTHER PUBLICATIONS

Written Opinion of the International Searching Authority, International Application No. PCT/US2010/002163, Oct. 13, 2010, 5 pgs. (unnumbered).
Written Opinion of the International Searching Authority, International Application No. PCT/US2010/002164. Oct. 8, 2010, 5 pgs. (unnumbered).
Written Opnion of the International Searching Authority for PCT Application No. PCT/US2009/006122 mailed Feb. 3, 2010 9 (seven pages).
Written Opinion of the International Searching Authority, International Application No. PCT/US2010/002693, Dec. 9, 2010, 8 pages (unnumbered).
PCT Application PCT/US2013/059527; filing date Sep. 12, 2013; Raytheon Company; International Search Report dated May 13, 2014.
EP Application EP09827853; filed Aug. 11, 2011; Raytheon Company; Supplemental European Search Report Apr. 23, 2014.
U.S. Appl. No. 12/583,346, filed Aug. 19, 2009; Rooney III et al.
U.S. Appl. No. 12/313,643, filed Nov. 21, 2008; Rooney et al.
U.S. Appl. No. 12/586,248, filed Sep. 18, 2009; Rooney III et al.
U.S. Appl. No. 12/800,174, filed May 10, 2010; Rooney III et al.
U.S. Appl. No. 12/587,949, filed Oct. 14, 2009; Kornstein et al.
U.S. Appl. No. 12/800,486, filed May 17, 2010; Rooney III.
Paik et al.; Condition Assessment of Aged Ships; Proceedings of the 16th International Ship and Offshore Structures Congress; Dec. 31, 2006; pp. 265-315; vol. 2; The 16th International Ship and Offshore Structures Congress, Southampton, UK.
PCT Application PCT/US2013/059550; filing date Sep. 12, 2013; Raytheon Company; International Search Report mailed Jun. 3, 2014.
International Maritime Organization; Anti-fouling systems; Focus on IMO; 2002; pp. 1-31; International Maritime Organization, London, UK.
Fernanadez; NAFTA and member country strategies for maritime trade and marine invasive species; Journal of Environmental Mangment; 2008; pp. 308-321; vol. 89; Elsevier Ltd.
HISMAR; HISMAR News Report No. 2; 2008; 4 pages; The HISMAR Consortium & Newcastle University.
HISMAR; Hull Identification System for Maritime Autonomous Robotics; 2008; 1 page; The HISMAR Consortium & Newcastle University.
Serene et al.; Design of a Remotely Operated Vehicle (ROV) for Underwater Ship Hull Cleaning; 2003; 6 pages; National University of Singapore.
PCT Application PCT/US2013/059548; filing date Sep. 12, 2013; Raytheon Company; International Search Report mailed Jun. 30, 2014.
U.S. Appl. No. 13/769,345, filed Feb. 17, 2013; Fraser M. Smith; Notice of Allowance mailed Jan. 12, 2015.
Hover et al.; A Vehicle System for Autonomous Relative Survey of In-Water Ships; Marine Technology Society Journal; Jul. 2007; pp. 44-55; vol. 41, No. 2; Marine Technology Society, Washington, D.C.
Menegaldo et al.; Development and Navigation of a Mobile Robot for Floating Production Storage and Offloading Ship Hull Inspection ; IEEE Transactions on Industrial Electronics; Sep. 2009; pp. 3717-3722; vol. 56, No. 9; IEEE Service Center, Piscataway, New Jersey.
Vaganay et al.; Hovering Autonomous Underwater Vehicle-System Design Improvements and Performance Evaluation Results; 30th International Symposium on Unmanned Untethered Submarine Technology; Jul. 9, 2009; pp. 1-14.
EP Application 11783852.4; filing date May 5, 2011; Raytheon Company; European Search Report; dated Aug. 18, 2014.
U.S. Appl. No. 13/769,344, filed Feb. 17, 2013; Fraser M. Smith; office action dated Oct. 28, 2014.
U.S. Appl. No. 12/313,643, filed Nov. 21, 2008; James H. Rooney III; office action dated Apr. 8, 2015.
U.S. Appl. No. 12/583,346, filed Aug. 19, 2009; James H. Rooney III; office action dated Apr. 8, 2015.
U.S. Appl. No. 13/769,339, filed Feb. 17, 2013; Fraser M. Smith; Notice of Allowance mailed Jan. 30, 2015.
U.S. Appl. No. 13/769,337, filed Feb. 17, 2013; Fraser M. Smith; Notice of Allowance mailed Feb. 10, 2015.
U.S. Appl. No. 13/769,344, filed Feb. 17, 2013; Fraser M. Smith; office action dated Mar. 10, 2015.
U.S. Appl. No. 13/769,342, filed Feb. 17, 2013; Fraser M. Smith; office action dated Mar. 10, 2015.
Office Action for U.S. Appl. No. 13/769,346 dated Aug. 11, 2015, 33 pages.
European Search Report for application 10823726.4 dated Jun. 23, 2015, 104 pages.
European Search Report for application EP10817533 dated Jul. 3, 2015, 124 pages.
Notice of Allowance received for U.S. Appl. No. 13/769,344 dated Jul. 8, 2015, 20 pages.
Office Action for U.S. Appl. No. 13/769,342 dated Jul. 14, 2015, 26 pages.

HULL ROBOT DRIVE SYSTEM

RELATED APPLICATIONS

This application is a continuation application of U.S. patent application Ser. No. 12/587,949, filed Oct. 14, 2009, which is incorporated by reference herein in its entirety.

FIELD OF THE INVENTION

The subject invention relates to a hull robot typically configured to clean and/or inspect the hull of a vessel and, in particular, to a drive module for such a hull robot.

BACKGROUND OF THE INVENTION

Robots have been proposed to clean and inspect vessels and underwater structures. Such robots typically include a drive subsystem for maneuvering the robot about the vessel or structure hull. Some drive subsystems include magnetic wheels or rollers. See U.S. Pat. Nos. 5,628,271; 3,088,429; and 2,104,062. The magnetic wheels of the '271 patent are stated to provide a holding power in excess of 2,000 pounds. The motor and drive train driving these wheels provides sufficient torque to overcome the strong magnetic tractive force. For example, the motor is stated to be a 24 volt DC motor providing 400 RPM.

Other drive subsystems include rollers and some means of adhering the robot to the hull via suction. See U.S. Pat. Nos. 4,809,383; 6,102,145; and 6,053,267. Some use rollers or wheels and a magnet spaced from the hull. See U.S. Pat. Nos. 6,564,815; 3,922,991; and 3,777,834. U.S. Pat. No. 4,697,537 discloses an impeller driven by a motor urging the robot against the hull.

Magnetic tracks and tracks with magnetic shoes have also been proposed. See U.S. Pat. Nos. 3,960,229; 2,132,661; 4,690,092; and 4,890,567 all disclosing electromagnets which may be selectively energized to control the drag force exerted by the magnets. U.S. Pat. No. 5,285,601, incorporated herein by this reference, discloses a blast cleaning device with two treads each including permanent magnets which continuously apply a tractive force.

BRIEF SUMMARY OF THE INVENTION

Some proposed hull cleaning robots are powered via a tether or cable connected between the robot and a power source on board the vessel. It may be advantageous, however, for a hull robot to operate more autonomously in which case the power source for the drive subsystem, cleaning brushes, and the like would be on-board the robot typically in the form of a battery or battery pack. Drive subsystems including electromagnetics are not favored because electromagnets may require too much power to operate. High voltage powerful motors for the drive subsystem are also not favored when battery power is used. At the same time, if permanent magnets are used and they provide a fairly strong tractive force, it can be difficult to engineer a suitable drive subsystem.

Co-pending U.S. patent application Ser. No. 12/313,643 filed Nov. 21, 2008 by the assignee hereof proposes a robot with a battery pack charged via a turbine/generator subsystem driven by water flowing past the hull when the vessel is underway. In this manner, the hull robot can continuously clean and/or inspect the vessel hull. In such a hull robot, a permanent magnet type drive track is desired. But, as noted above, since the drive subsystem is battery powered, a mechanism to control the tractive force supplied by the permanent magnets is needed.

One embodiment features, in one aspect, a hull cleaning and/or inspection robot which is powered via fluid moving past the hull while the vessel is underway. A preferred drive module may include a plurality of permanent magnet elements constrained by a tunnel body and switchable between a shunted state and a non-shunted state. In this way, the magnets are shunted as they reach the end of their travel along the tunnel body and remain shunted until they again engage the hull to conserve battery power. In their non-shunted state, the magnets provide a sufficient tractive force to keep the hull robot on the hull of the vessel. In other embodiments, the drive module hereof may be used in conjunction with systems other than a hull cleaning and/or inspection robot.

An example of a hull robot includes a robot body, at least one drive module for maneuvering the robot about the hull, an on-board power source, and a motive subsystem for the drive module powered by the on-board power source. A plurality of permanent magnet elements are associated with the drive module and each are switchable between a non-shunted state when adjacent a hull and a shunted state when not adjacent the hull.

The motive subsystem may include at least one turbine powered by fluid moving past the hull, a generator driven by the turbine for charging the on-board power source, and a motor powered by the on-board power source driving the drive module. A typical on-board power source includes at least one battery.

In one version, each magnet element includes a diametrically polarized cylindrical magnet rotatably disposed in a housing. The preferred housing includes non-magnetic material sandwiched between ferromagnetic material. Each magnet element may further include a switch attached to the cylindrical magnet for rotating the cylindrical magnet in the housing between the shunted state and the non-shunted state.

In one example, the drive module may also include a tunnel body and each magnet element may include a carriage which maneuvers with respect to the tunnel body. The tunnel body may include opposing side tracks and the carriage then includes spaced bearings riding in the side tracks of the tunnel body. The typical tunnel body may support a drive train and each carriage is connected to the drive train. In one example, the drive train may include a chain about spaced sprockets engaging the chain. Each carriage typically includes at least one connector extending into the chain.

There may also be spaced panels supporting the tunnel body. A plurality of flexures typically may extend between each supporting panel and the tunnel body. In one example, the tunnel body is segmented and there is at least one flexure per segment. One or both panels may include a switching feature such as a closed loop groove therein. The magnet switch assemblies ride in the groove and the groove is configured to activate switch assemblies to rotate the magnets at opposing ends of the closed loop. Each magnet element may also include a protective covering.

Also featured is a drive module including a plurality of magnet elements each having a housing with non-magnetic material sandwiched between ferromagnetic material and a bore extending into the housing, a magnet rotatably disposed in the bore, and a switch assembly for rotating the magnet. A carriage for each magnet includes at least one bearing and a connector. A tunnel body includes at least one track for the bearings of the carriages. A drive train for the tunnel body is attached to the connectors of the carriages. At least one panel supports the tunnel body. The panel typically includes means for actuating the switch assemblies such as a feature in the panel actuating the switch assemblies. The feature is configured to rotate the magnet at opposing ends of the tunnel.

One drive module features a plurality of permanent magnet elements each switchable between a non-shunted state and a shunted state, a switch assembly for each magnet element rotating each permanent magnet element to change the state thereof, a tunnel body constraining the permanent magnet elements, and a drive train for driving the tunnel body with respect to the permanent magnet elements. In one example, the means drive train includes spaced wheels rotatably supported by the tunnel assembly and a flexible member about the wheels connected to the permanent magnet elements.

Thus, the subject invention in some embodiments, need not achieve all the above objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
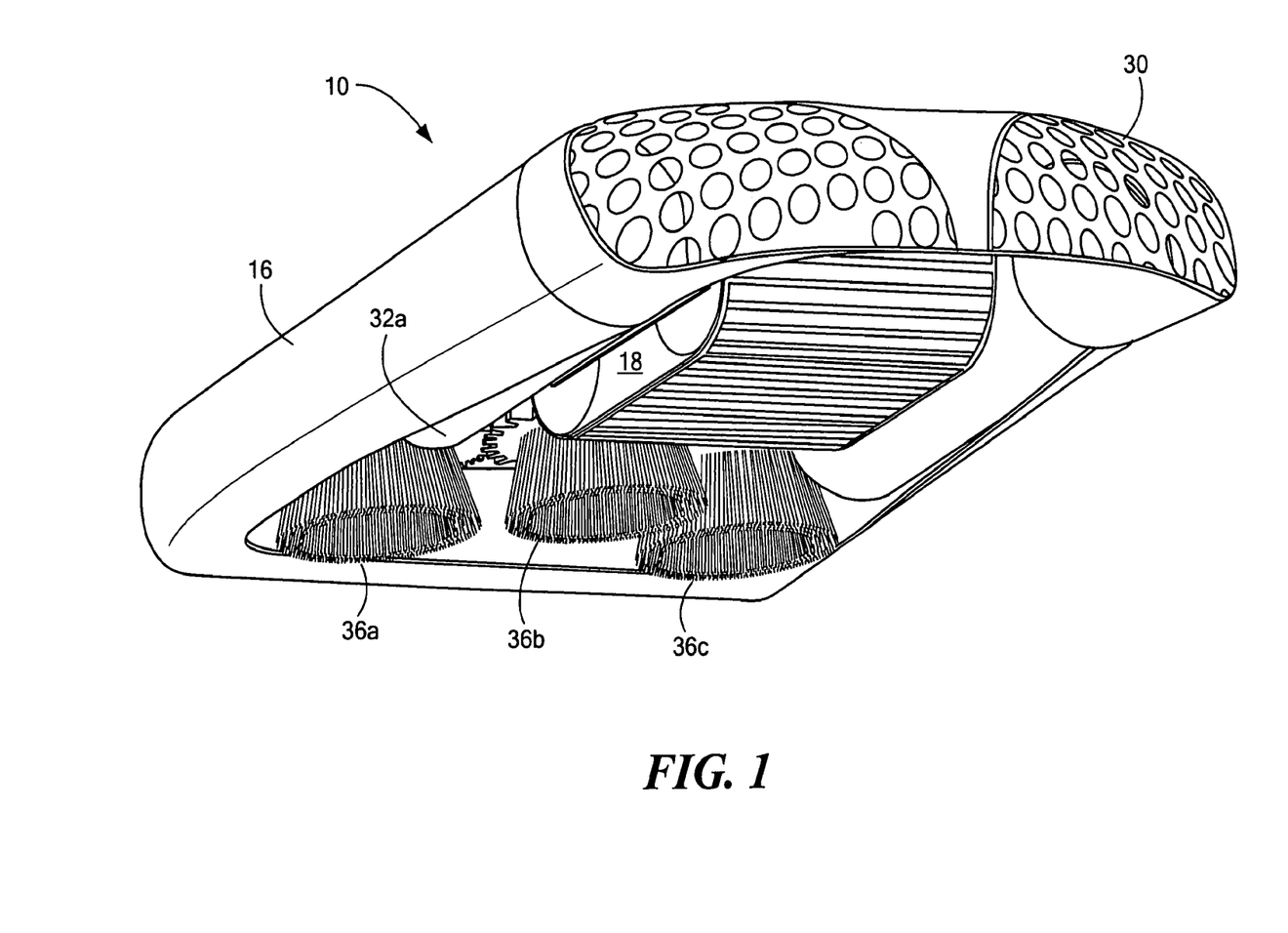
FIG. 1 is a schematic three-dimensional view of the bottom of an example of a hull robot.
Figure 2:
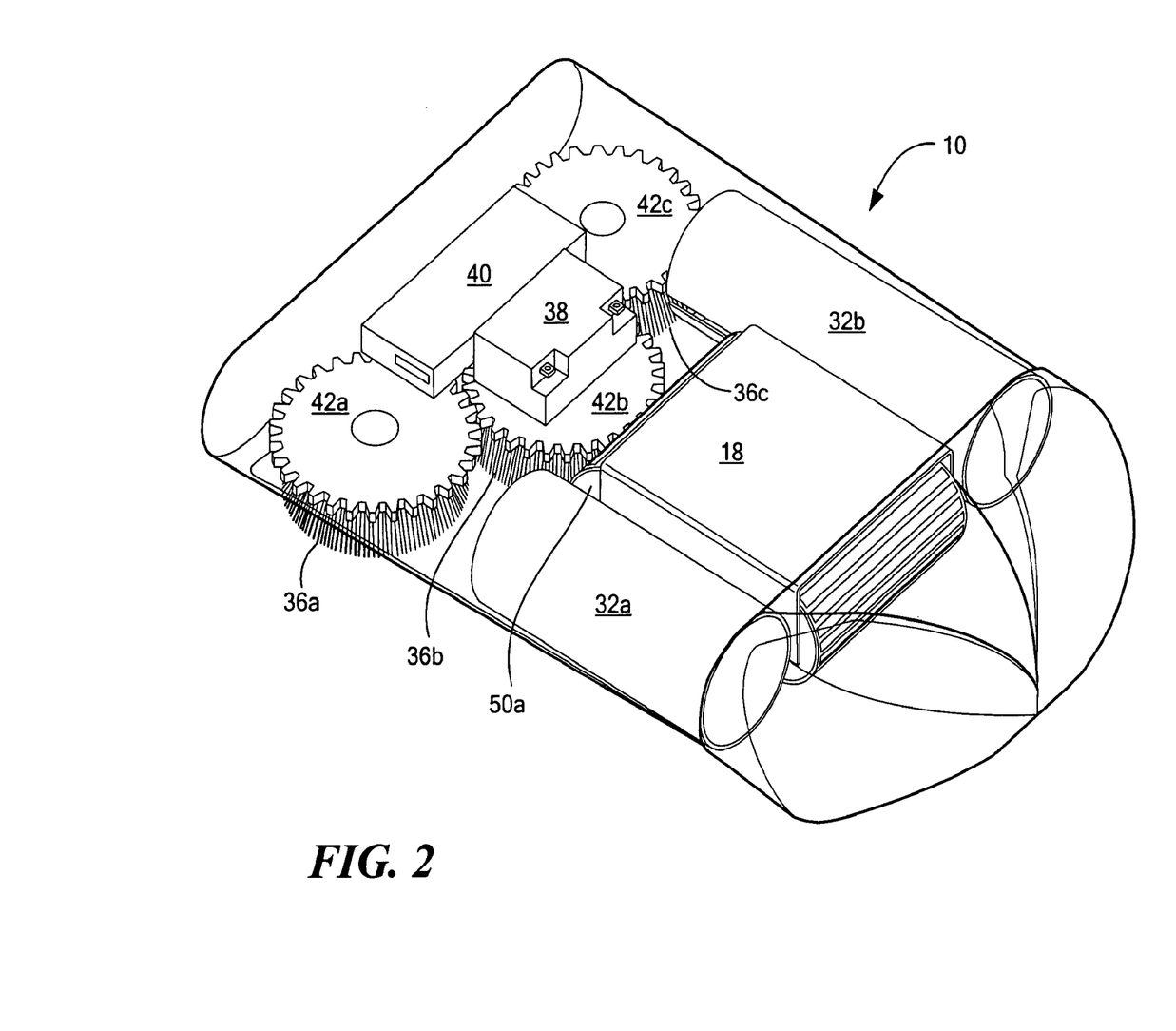
FIG. 2 is a schematic view showing the primary subsystems associated with the hull robot of FIG. 1.

FIGS. 1-2 show one example of hull robot 10 with robot body 16 supporting combined turbine/generator units 32a and 32b. The turbines are responsive to fluid moving past the vessel hull when the vessel is underway, e.g., the turbine intakes are behind screen 30 and are responsive to fluid moving past the vessel hull. The turbines drive the generators which in turn charge battery pack 38. Electronic control module 40 is powered by battery pack 38 as are the motors and other power devices on-board robot 10. Typically, one motor drives, for example, gear 42b which in turn drives gears 42a and 42c. In this way, cleaning brushes 36a-36c are operated. Another motor is typically associated with drive module 18 which both holds the robot on the hull and maneuvers the robot about the vessel hull. The motor system for drive module 18 may vary in design. For example, the turbines could directly drive module 18 (and/or brushes 36a-36c). Also, brushes 36a-36c could be driven in different ways. There may also be more than one drive module.

Figure 3:
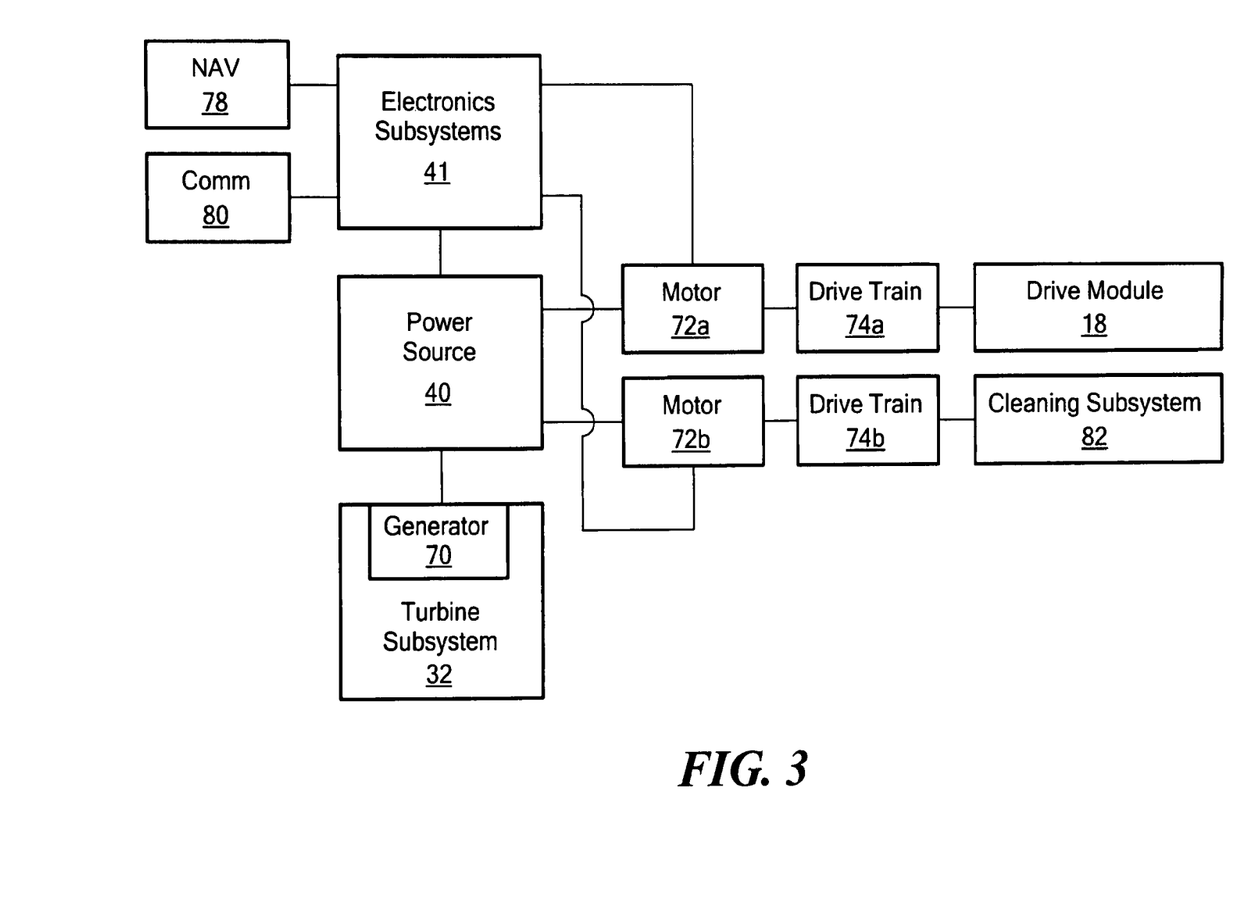
FIG. 3 is a block diagram showing several of the subsystems associated with a typical hull cleaning robot.

FIG. 3 illustrates an example including turbine subsystem 32 (including one or more devices actuatable by fluid flowing past the hull) and generator 70 which recharges power source 40. One or more motors such as motors 72a and 72b are powered by power source 40. Motor 72a drives drive module 18 via drive train 74a. The direction of travel of the robot can be reversed via electronic control subsystem 41 which is configured to reverse the direction of motor 72a based on inputs, for example, from navigation subsystem 78 and/or communication subsystem 80. Electronic controller 41 is also powered by power source 40. Similarly, motor 72b drives cleaning subsystem 82 (e.g., one or more brushes as described above) via drive train 74b. Motor 72b is also energized by power source 40. In other embodiments, the one or more motors may operate on the basis of a power source other than electricity. Motors are known, for example, that are fluid driven. The turbine subsystem then, may pump fluid under pressure to the motors. If the cleaning subsystem is passive, e.g., a pad and/or a squeegee, motor 72b and drive train 74b would not be required. In other examples, the drive shafts of the turbines are mechanically linked to the cleaning brushes and/or drive module. Thus, the design of the motive subsystem for the drive module may vary.

Figure 4:
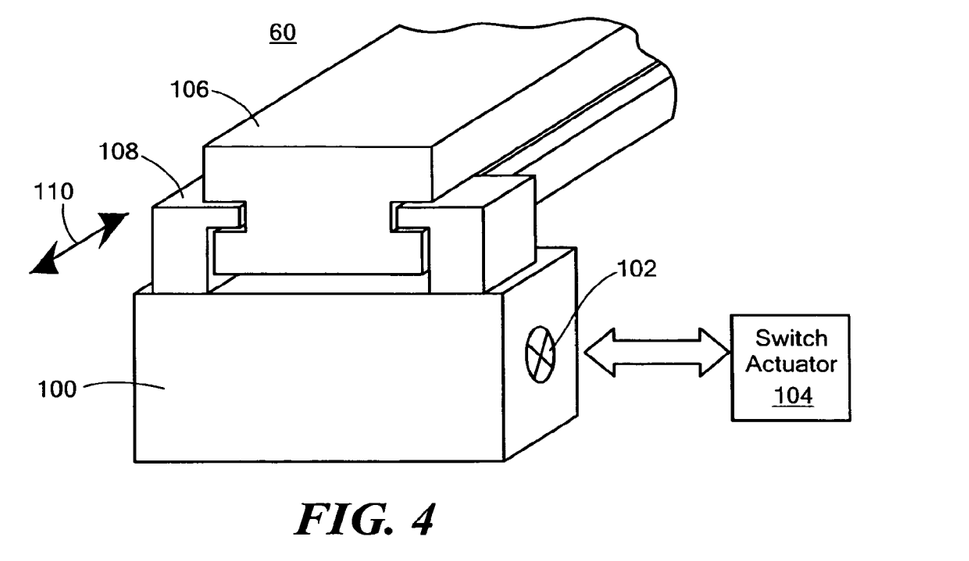
FIG. 4 is a schematic three-dimensional partial front view showing several of the components associated with an example of a drive module.

FIG. 4 schematically depicts certain components of a version of a preferred drive module. There are typically a plurality of permanent magnet elements such as element 100. Switch assembly 102 switches element 100 between a shunted and a non-shunted state. Actuator 104 actuates switch 102 typically between a shunted state when element 100 is not adjacent the vessel hull and a non-shunted state when element 100 is adjacent the vessel hull. Tunnel body 106 is configured to constrain the movement of element 100 which typically includes some type of carriage 108. There are also some means to drive tunnel body 106 with respect to permanent magnet element 100 as shown by arrow 110.

Figure 5:
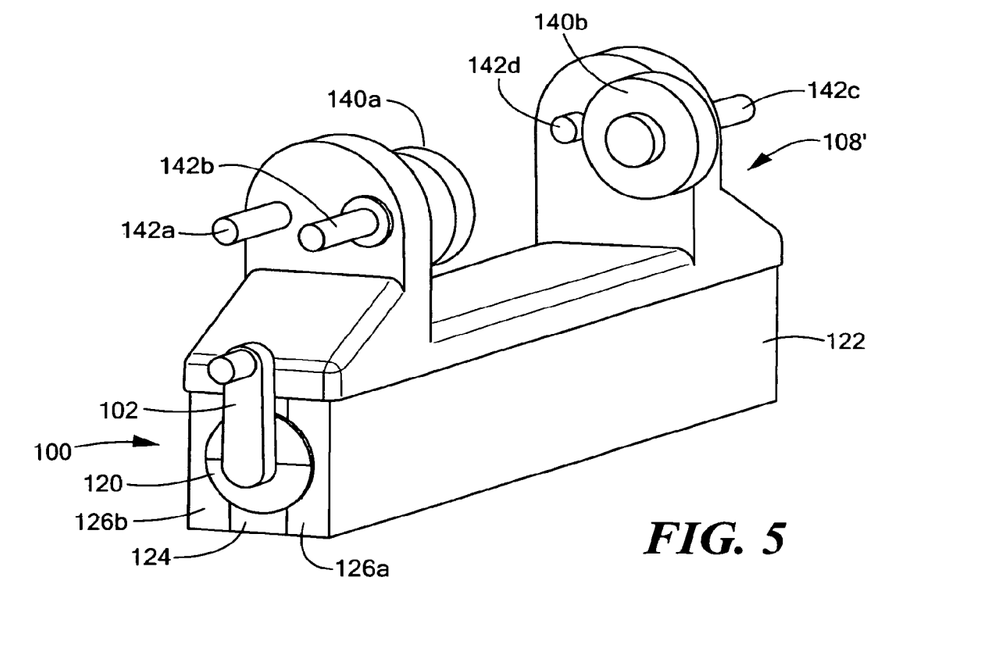
FIG. 5 is a schematic three-dimensional front view showing one example of a switchable permanent magnetic element associated with a drive module.
Figure 6:
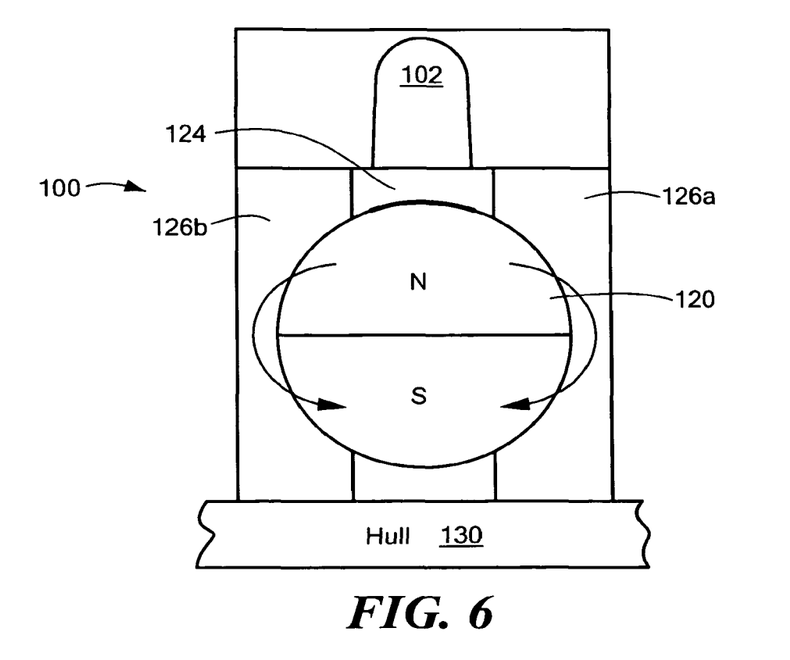
FIG. 6 is a schematic cross-sectional side view showing the permanent magnet element of FIG. 5 in its shunted state.
Figure 7:
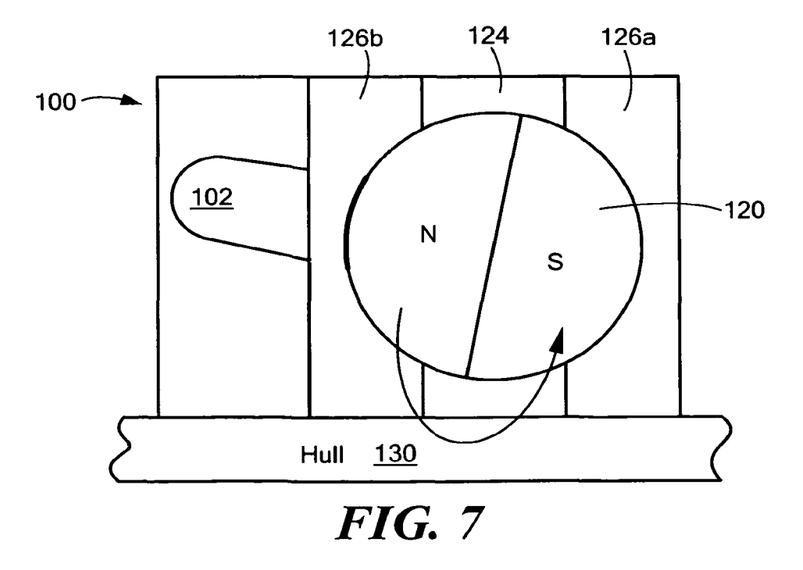
FIG. 7 is a schematic cross-sectional side view showing the permanent magnet element of FIG. 5 in its non-shunted state.

FIG. 5 shows a design where permanent magnet element 100 includes diametrically polarized cylindrical magnet 120 rotatably disposed in a bore of housing 122. Housing 122 includes non-magnetic material 124 (e.g., aluminum, plastic, or the like) sandwiched between ferromagnetic material 126a and 126*b* (e.g., steel). Switch 102 is attached to cylindrical magnet 120 and rotates it as shown in FIG. 6-7. In FIG. 6, magnet 120 is shunted since the magnetic field flows from the north pole, outwardly through ferromagnetic material 126*a* and 126*b*, and to the south pole. The attraction of magnet 120 to vessel hull 130 is thus minimized. Activating switch 102 rotates magnet 120 as shown in FIG. 7 so each pole is proximate ferromagnetic material 126*a* or 126*b*. As shown in figure, the south pole is in contact with ferromagnetic material 126*a* and the north pole is in contact with ferromagnetic material 126*b*. The magnetic field flows from the north pole of the magnet into body 126*b*, to the ship's hull 130, to body 126*a*, and then back to the south pole of the magnet. In this non-shunted state, the attraction of magnet 120 to hull 130 is maximized.

Typically, switch 102 is activated to shunt magnet 120 as permanent magnet element 100 reaches the end of its travel on the hull and switch 102 is again activated to actuate magnet 120 as permanent magnet element 100 again comes into contact with the hull. In this way, power usage is minimized and yet there is still a very strong tractive force provided to keep the robot on the hull. Power usage is minimized because power is not wasted in removing the individual permanent magnet elements from the hull. Also, damage to the hull is minimized since the permanent magnet elements are not switched to their non-shorted states until they are actually in contact with the hull. Each permanent magnet element may include a protective covering to also reduce damage to the vessel hull. The intent is to control the holding force exerted by the magnets but at the same time use permanent magnets which consume no power unlike electromagnets.

Figure 8:
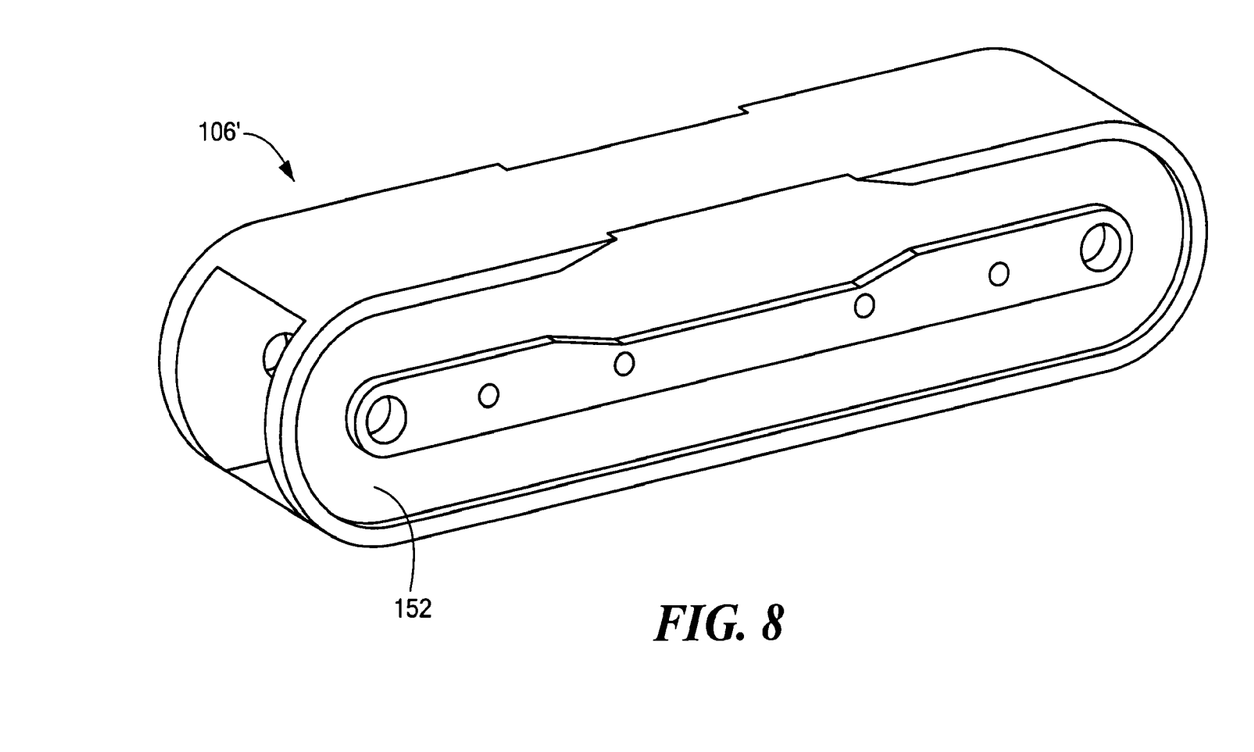
FIG. 8 is a schematic three-dimensional side view of an example of a tunnel body constraining the individual permanent magnet elements.

FIG. 5 also shows carriage 108' with spaced rotating bearings 140*a* and 140*b* and connectors 142*a*-142*d*. Bearings 140*a* and 140*b* ride in side tracks in tunnel body 106', FIG. 8. In FIG. 8, oval shaped side track 152 is shown.

Figure 9:
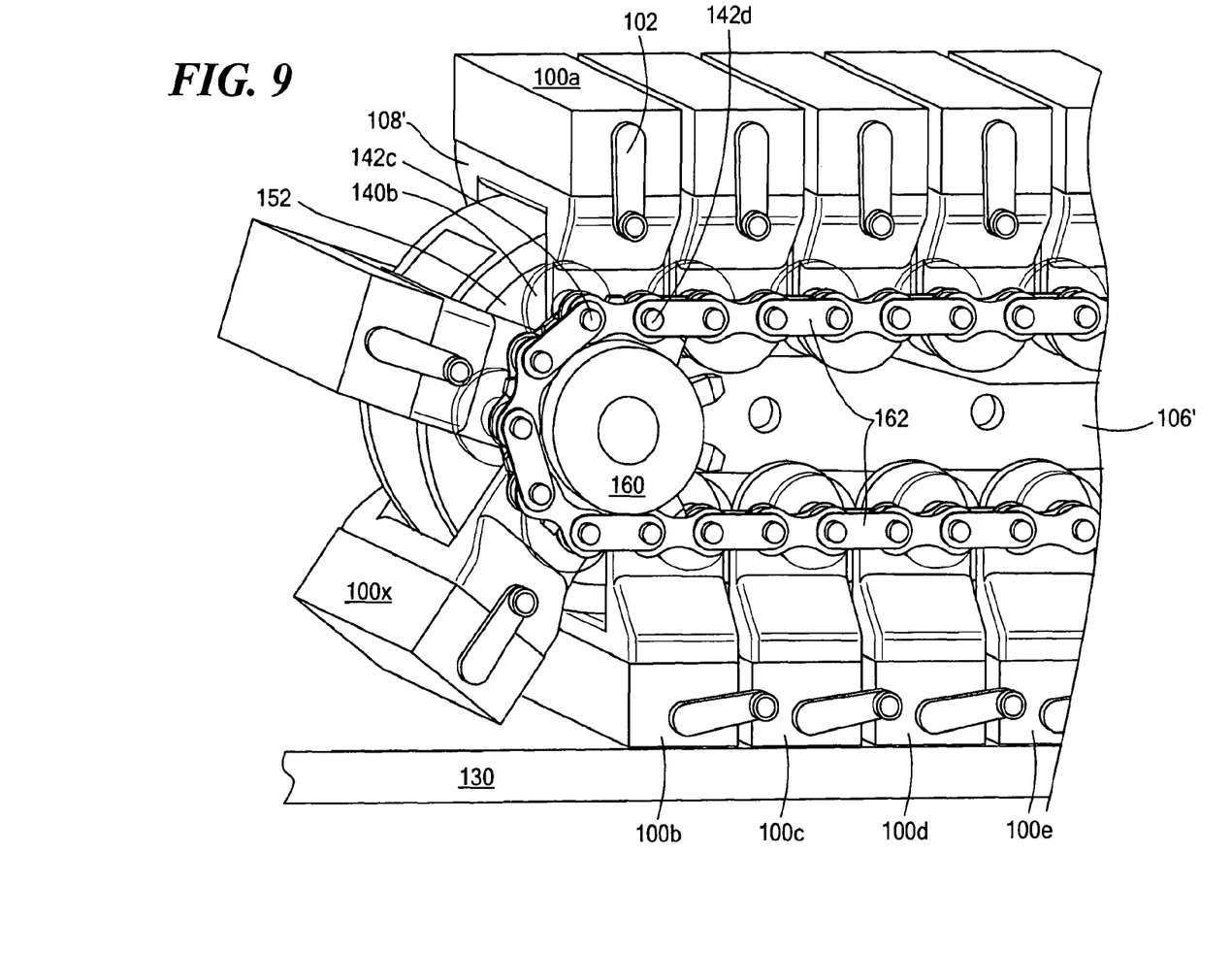
FIG. 9 is a schematic three-dimensional side view showing an example of a portion of the mechanism which drives the tunnel body relative to the permanent magnet elements.

FIG. 9 shows how tunnel body 106' supports a drive train such as spaced sprocket wheels including wheel 160 (which may be driven by motor 72*a* and drive train 74*a*, FIG. 3). Chain 162 extends around the spaced sprocket wheels. Bearing 140*b* of carriage 108' of permanent magnet element 100*a* is constrained in track 152 of tunnel body 106' and connectors 142*c* and 142*d* extend into chain 162.

Since tunnel body 106' is fixed to robot body 10, FIGS. 1-2 and since permanent magnet elements 100*b*-100*e* in their non-shunted states are strongly attracted to vessel hull 130, chain 162 actually drives tunnel body 106' forward (and rearward) and thus the robot body is driven with respect to the vessel hull via the rotation of chain 162 and about sprocket 160.

FIG. 9 also shows that permanent magnet element 100*a* is shunted via the position of switch 102. Permanent magnet element 100*x* is either an element first coming into position to be attracted to the hull 130 or it is leaving hull 130 depending on the direction of robot travel. If permanent magnet element 100*x* is just coming into position to be attracted to hull 130, it is switched from the shunted position shown to its non-shunted position once permanent magnet element 100*x* occupies the position of permanent magnet element 100*b*. If permanent magnet element 100*x* is just leaving hull 130, or is about to leave the hull, it is switched into a shunted state just after it occupies the position of permanent magnet element 100*b*.

Figure 10:
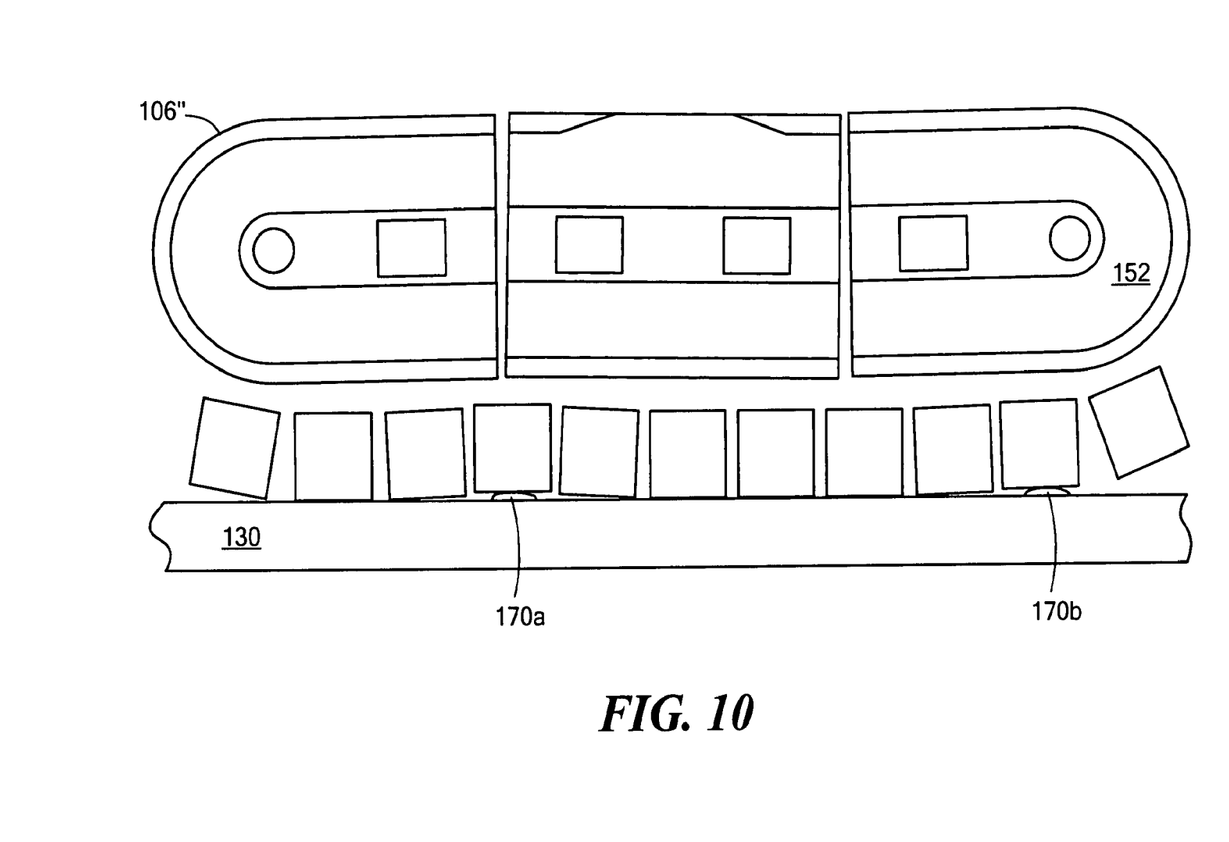
FIG. 10 is a schematic three-dimensional side view of a segmented tunnel body.
Figure 11:
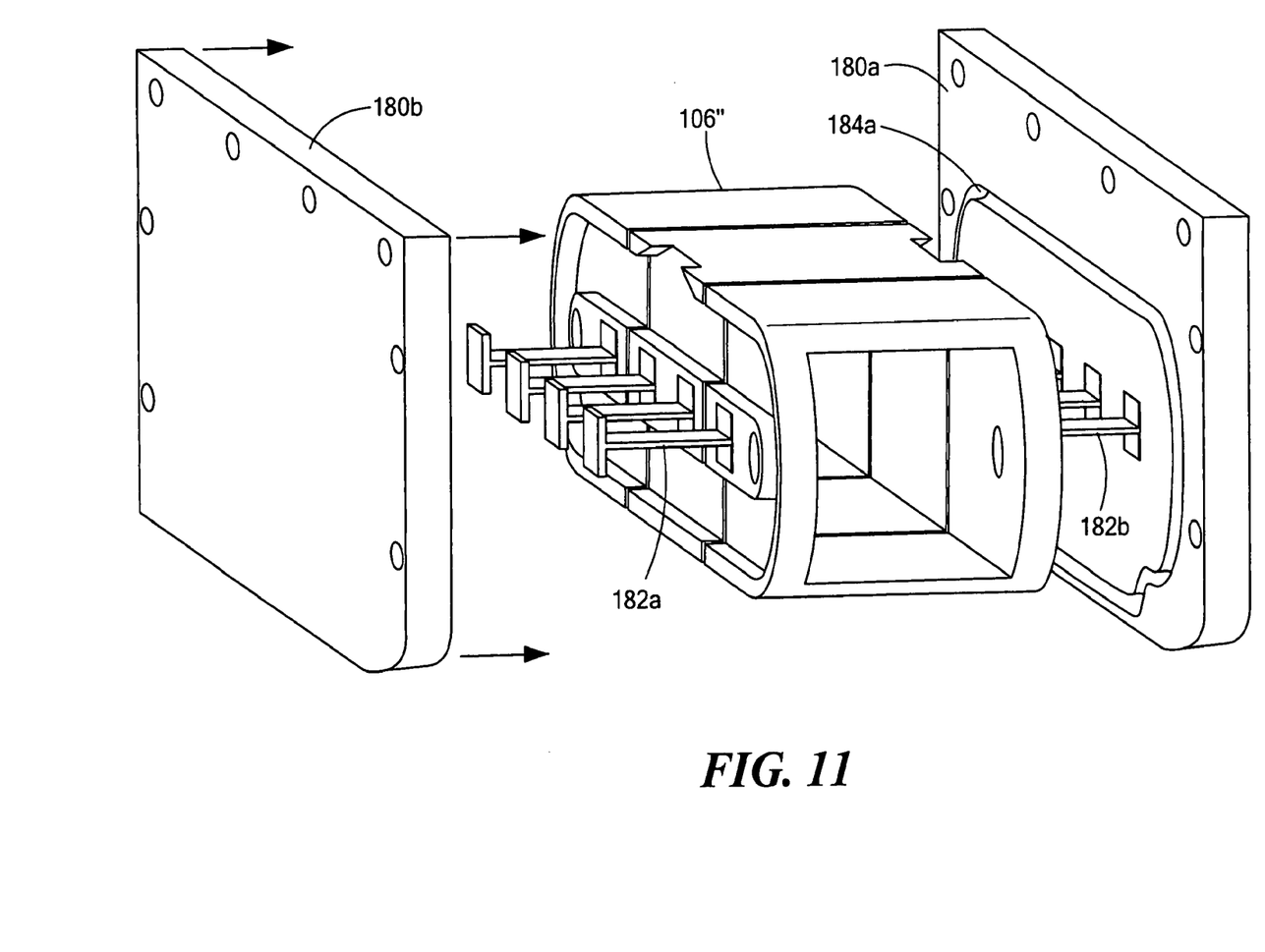
FIG. 11 is a schematic three-dimensional front view showing spaced side plate members flexibly supporting the segmented tunnel body shown in FIG. 10.
Figure 12:
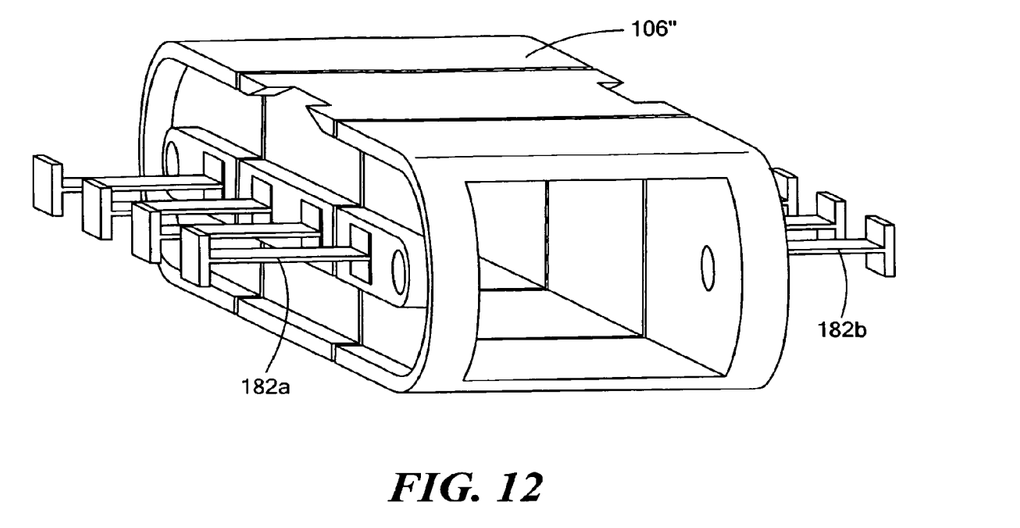
FIG. 12 is a schematic three-dimensional front view showing in more detail the flexure members of FIG. 11.

FIG. 10 shows a segmented design for tunnel body 106" to allow for articulation of the tunnel body and track system to maximize the contact area for each permanent magnet element in the presence of non-uniformities 170*a* and 170*b* on hull 130. In FIG. 11, spaced panels 180*a* and 180*b* support tunnel body 106" via flexures 182*a*, 182*b*, and the like, FIGS. 11-12. Typically, there is at least one flexure for each tunnel body segment as shown in FIG. 12. Side panels 180*a* and 180*b* are affixed to the robot body or to a turret rotatably attached to the robot body.

Figure 13:
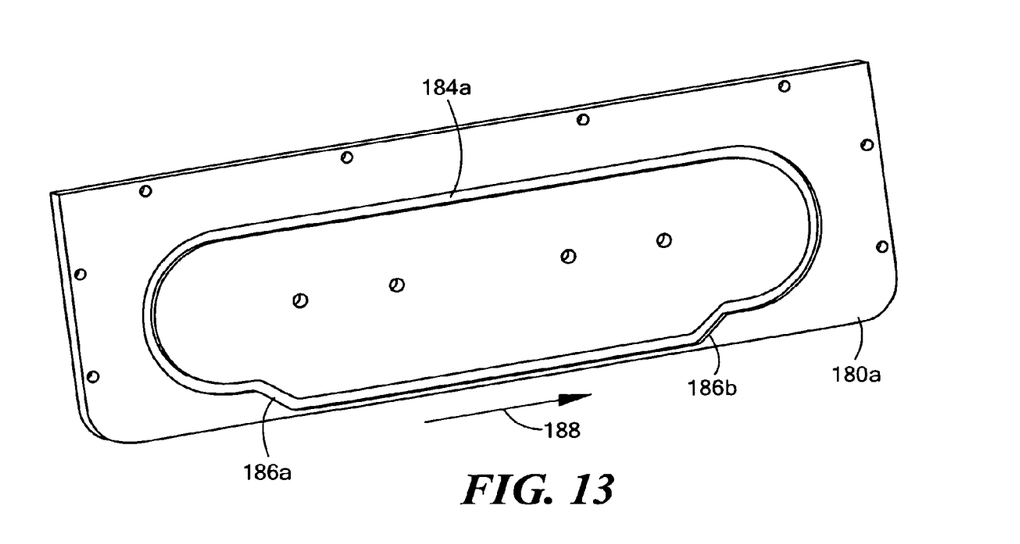
FIG. 13 is a schematic three-dimensional front view of the inside of one of the panels of FIG. 11.
Figure 14:
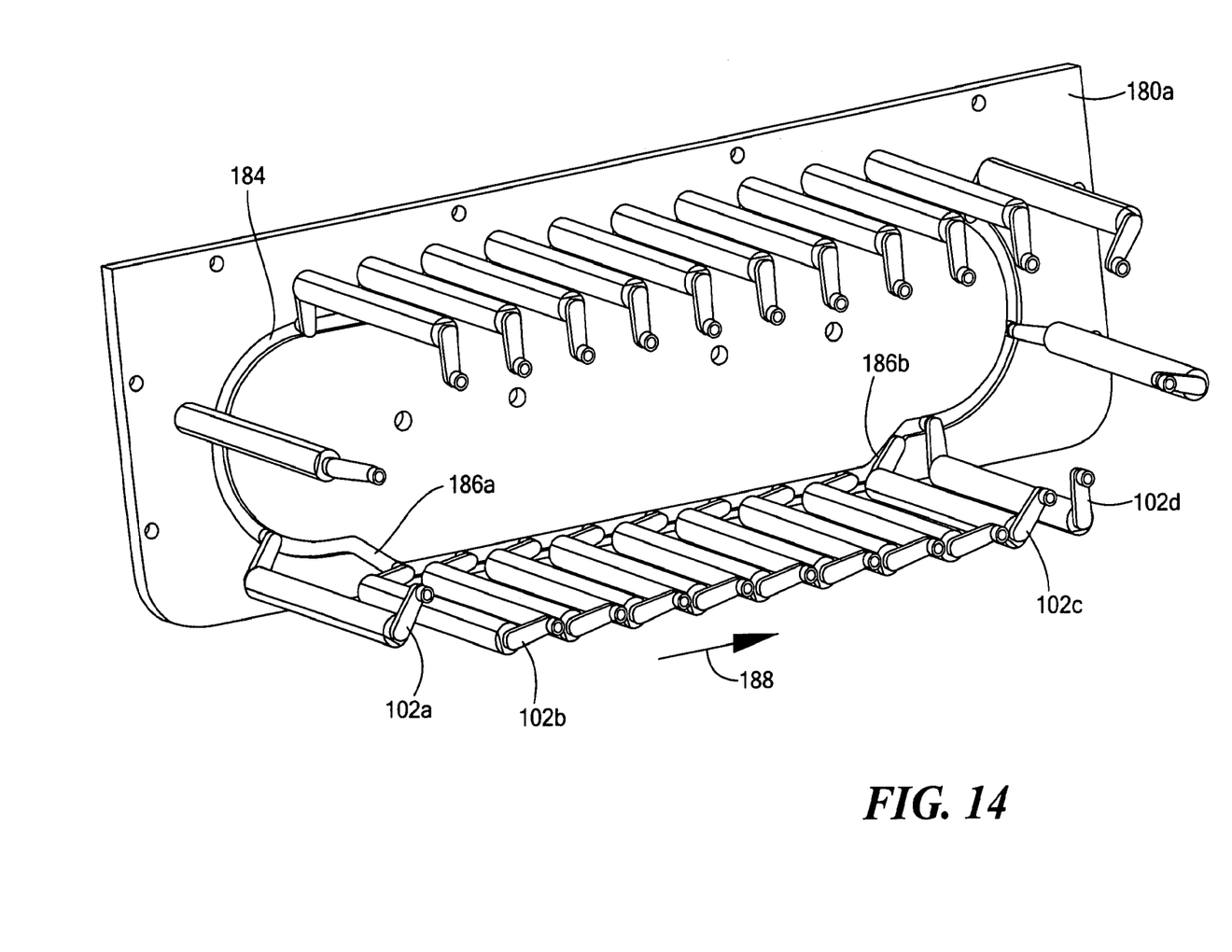
FIG. 14 is a schematic three-dimensional front view of the panels shown in FIG. 13 depicting how a feature in the panel acts as the switch actuator.

FIG. 11 also shows an actuation feature such as closed loop groove 184*a* on the inside of panel 180*b*. As shown in FIG. 13, these grooves in the side panels function to actuate the switches of the permanent magnet elements. At groove ends 186*a* and 186*b* there is a jog. If the direction of travel of the hull robot is as shown by arrow 188 and the vessel hull is at the bottom of the figure, jog 186*b* actuates the permanent magnet element switches to shunt the permanent magnet elements and at jog 186*a* the switches are actuated again to return the permanent magnet elements to their non-shunted configuration. FIG. 14 shows more complete switching assemblies 102*a*-102*d* and depicts how switch 102*a* is in its shunted position but switch 102*b*, via groove jog 186*a*, has been actuated to its non-shunted position. Similarly, jog 186*b* turns switch 102*c* to the shunted position for the remainder of its travel about the front and top of panel 180*a* corresponding to the front and top of tunnel body 106', FIG. 9.

Figure 15:
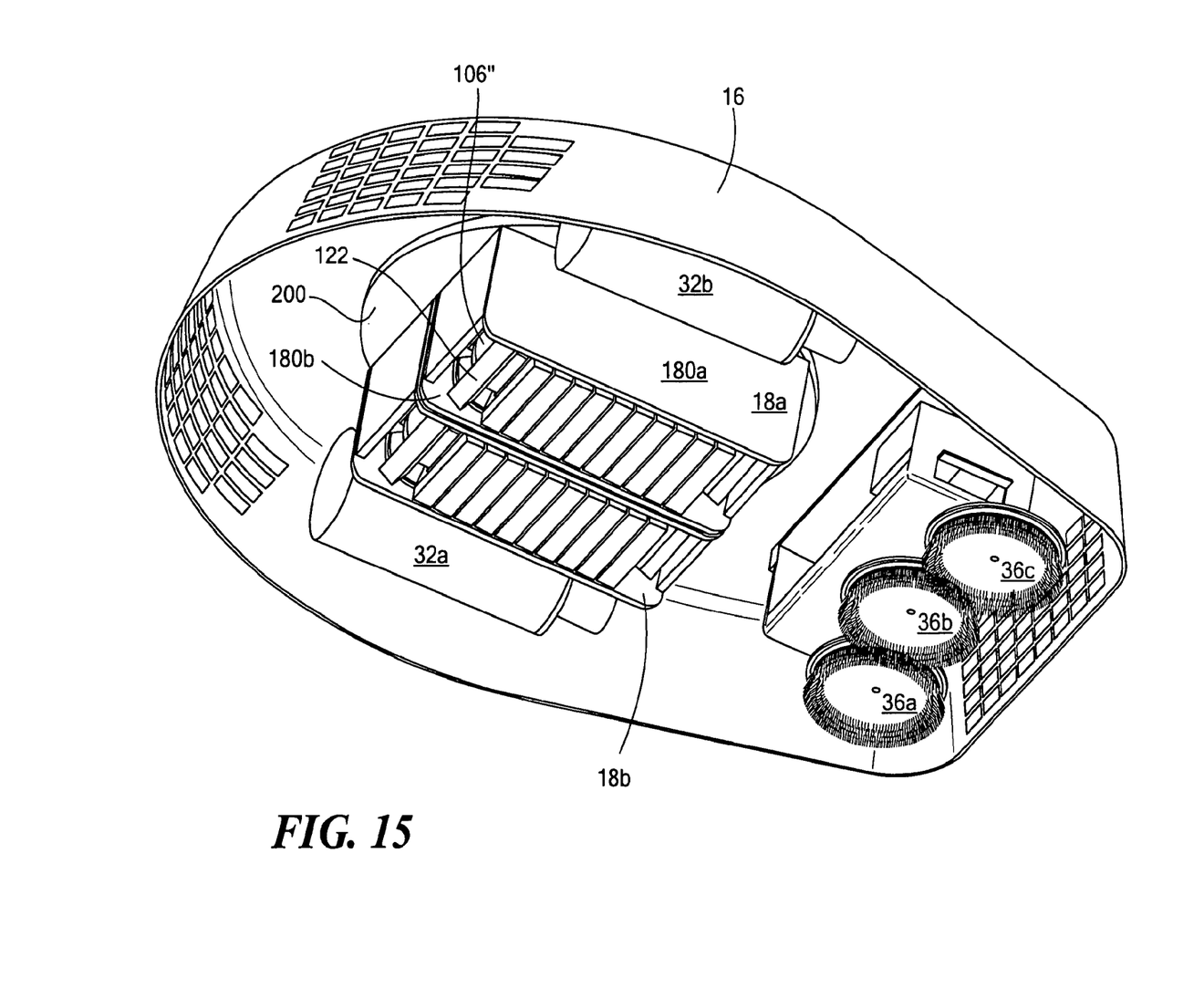
FIG. 15 is a schematic three-dimensional bottom view showing an example including a plurality of drive modules in place on a hull robot.

FIG. 15 shows two complete drive modules 18*a* and 18*b* mounted to turret 200 which may be rotatable with respect to the robot body. In this way, turret 200 can be rotated to keep the intakes of turbine/generator assemblies 32*a* and 32*b* aligned with the direction of water flowing past the vessel hull irrespective of the direction of travel of the robot about the vessel hull. See U.S. patent application Ser. No. 12/583,346, filed Aug. 19, 2009.

In one preferred design, the tunnel body performs two functions: it constrains the movement of the permanent magnet elements and also serves to house the drive mechanism (e.g., a chain about two sprockets) connected to the carriages of the permanent magnet elements. This design also provides structural support against slack in the drive assembly. The side plates also serve two functions: they flexibly support the tunnel body and they include means for actuating the switches of the permanent magnet elements. In the preferred design, the magnetic elements are switched between their minimum tractive state and their maximum tractive state irrespective of the direction of travel of the robot. These are not limitations of the subject invention, however, as other designs are possible.

Other features associated with the typical hull robot are disclosed in the patents cited in the Background section hereof and incorporated herein by this reference. Also, U.S. patent application Ser. No. 12/313,643 filed Nov. 21, 2008 by the assignee hereof discloses additional features which may be associated with a hull robot. The drive module disclosed herein, however, is not limited to use in connection with such a vessel hull robot. The drive module, for example, can be used on any ferromagnetic body including but not limited to vessel hulls, underwater structures, and the like. "Hull," as used herein, then, broadly means a structure to be traversed.

Thus, although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A hull robot comprising:
   a robot body;
   at least one drive module for maneuvering the robot about a hull;
   an on-board power source;
   a motive subsystem for the drive module powered by the on-board power source; and
   a plurality of permanent magnet elements associated with the drive module each switchable between a non-shunted state when adjacent the hull and a shunted state when not adjacent the hull.

2. The hull robot of claim 1 in which the motive subsystem includes at least one turbine powered by fluid moving past the hull, a generator driven by the turbine for charging the on-board power source, and a motor powered by the on-board power source driving the drive module.

3. The hull robot of claim 1 in which the on-board power source includes at least one battery.

4. The hull robot of claim 1 in which each magnet element includes a diametrically polarized cylindrical magnet rotatably disposed in a housing.

5. The hull robot of claim 4 in which the housing includes non-magnetic material sandwiched between ferromagnetic material.

6. The hull robot of claim 4 in which each magnet element further includes a switch attached to the cylindrical magnet for rotating the cylindrical magnet in the housing between the shunted state and the non-shunted state.

7. The hull robot of claim 4 in which the tunnel body supports a drive train.

8. The hull robot of claim 7 in which each carriage is connected to the drive train.

9. The hull robot of claim 7 in which the drive train includes a chain about spaced sprockets engaging the chain.

10. The hull robot of claim 9 in which each carriage includes at least one connector extending into the chain.

11. The hull robot of claim 1 in which the tunnel body includes opposing side tracks and the carriage includes spaced bearings riding in the side tracks of the tunnel body.

12. The hull robot of claim 1 further including spaced panels supporting the tunnel body.

13. The hull robot of claim 12 further including a plurality of flexures extending between each supporting panel and the tunnel body.

14. The hull robot of claim 12 in which at least one said panel includes a closed loop groove therein, the switch assembly rides in the groove, and the groove is configured to activate the switch assemblies to rotate the magnets at opposing ends of the closed loop.

15. The hull robot of claim 1 which the tunnel body is segmented and there is at least one flexure per segment.

16. The hull robot of claim 1 in which each magnet element includes a rotatable magnet and a switch assembly attached thereto.

17. The hull robot of claim 1 in which each magnet element includes a protective covering.

* * * * *